US006640784B1

(12) United States Patent
Sims, Jr.

(10) Patent No.: US 6,640,784 B1
(45) Date of Patent: Nov. 4, 2003

(54) SPARK IGNITION DIRECT INJECTION SYSTEM

(75) Inventor: Dewey McKinley Sims, Jr., Wayne, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/267,894

(22) Filed: Oct. 9, 2002

(51) Int. Cl.[7] ................................................ F02M 55/02
(52) U.S. Cl. ....................................... 123/470; 123/456
(58) Field of Search ................................. 123/470, 469, 123/468, 472, 467, 456, 198 D, 509

(56) References Cited

U.S. PATENT DOCUMENTS

| | | |
|---|---|---|
| 2,166,331 A | 7/1939 | Waeber |
| 3,038,456 A | 6/1962 | Dreisin |
| 4,066,213 A | 1/1978 | Stampe |
| 4,295,452 A * | 10/1981 | Lembke et al. ............. 123/470 |
| 4,528,959 A | 7/1985 | Hauser, Jr. |
| 4,567,872 A | 2/1986 | Roosa |
| 4,844,339 A | 7/1989 | Sayer et al. |
| 4,901,700 A | 2/1990 | Knight et al. |
| 4,944,262 A | 7/1990 | Molina et al. |
| 5,121,731 A | 6/1992 | Jones |
| 5,244,180 A | 9/1993 | Wakeman et al. |
| 5,247,918 A | 9/1993 | Wakeman |
| RE34,945 E | 5/1995 | Sayer et al. |
| 5,697,345 A | 12/1997 | Genter et al. |
| 5,697,554 A | 12/1997 | Auwaeter et al. |
| 5,752,487 A | 5/1998 | Harrell et al. |
| 5,785,024 A | 7/1998 | Takei et al. |
| 5,806,494 A | 9/1998 | Glassey |
| 5,820,101 A | 10/1998 | Ricco |
| 5,934,254 A * | 8/1999 | Vetters et al. ............... 123/470 |
| 6,012,418 A | 1/2000 | Bodenhausen et al. |
| 6,021,762 A | 2/2000 | Zeidler et al. |
| 6,062,200 A * | 5/2000 | Hofmeister ................. 123/470 |
| 6,102,007 A | 8/2000 | Furst |
| 6,135,094 A * | 10/2000 | Okada et al. ............... 123/470 |
| 6,148,797 A | 11/2000 | Gmelin |
| 6,227,169 B1 | 5/2001 | Sato et al. |
| 6,260,776 B1 | 7/2001 | Popp |
| 6,263,863 B1 | 7/2001 | Giovannini et al. |
| 6,270,024 B1 | 8/2001 | Popp |
| 6,279,540 B1 | 8/2001 | Greaney et al. |
| 6,279,842 B1 | 8/2001 | Spain |
| 6,302,088 B1 | 10/2001 | Kato |
| 6,314,943 B1 | 11/2001 | Burch et al. |

* cited by examiner

Primary Examiner—Carl S. Miller
(74) Attorney, Agent, or Firm—Michael Best & Friedrich LLP

(57) ABSTRACT

A fuel injection system and method includes a cylinder head having an injector port. A fuel injector has a first end and a second end, the second end being received in the injector port. A fuel rail includes a socket for receiving the first end of the fuel injector. A spring assembly is coupled between the fuel rail and the injector to bias the injector toward the cylinder head. The spring assembly includes a housing, a spring in the housing, and a viscous material at least partially surrounding the spring in the housing. The spring assembly utilizes a squeeze film effect to resist movement of the injector in a direction toward the fuel rail. Preferably, the spring is comprised of a plurality of alternatingly-oriented disc springs, and the viscous material is a grease.

25 Claims, 4 Drawing Sheets

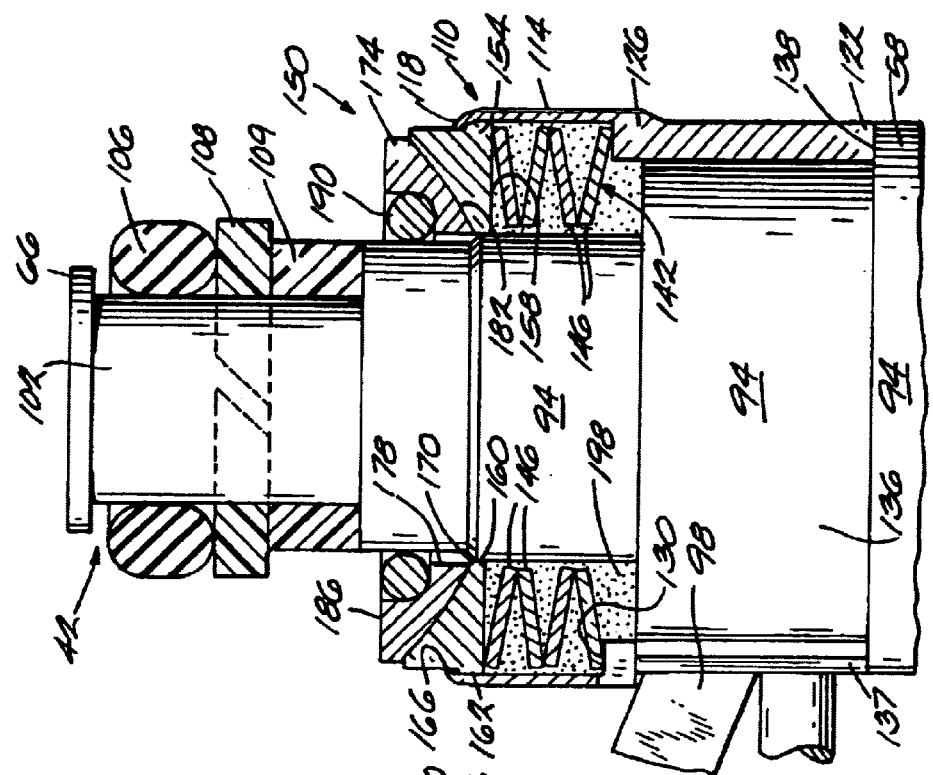

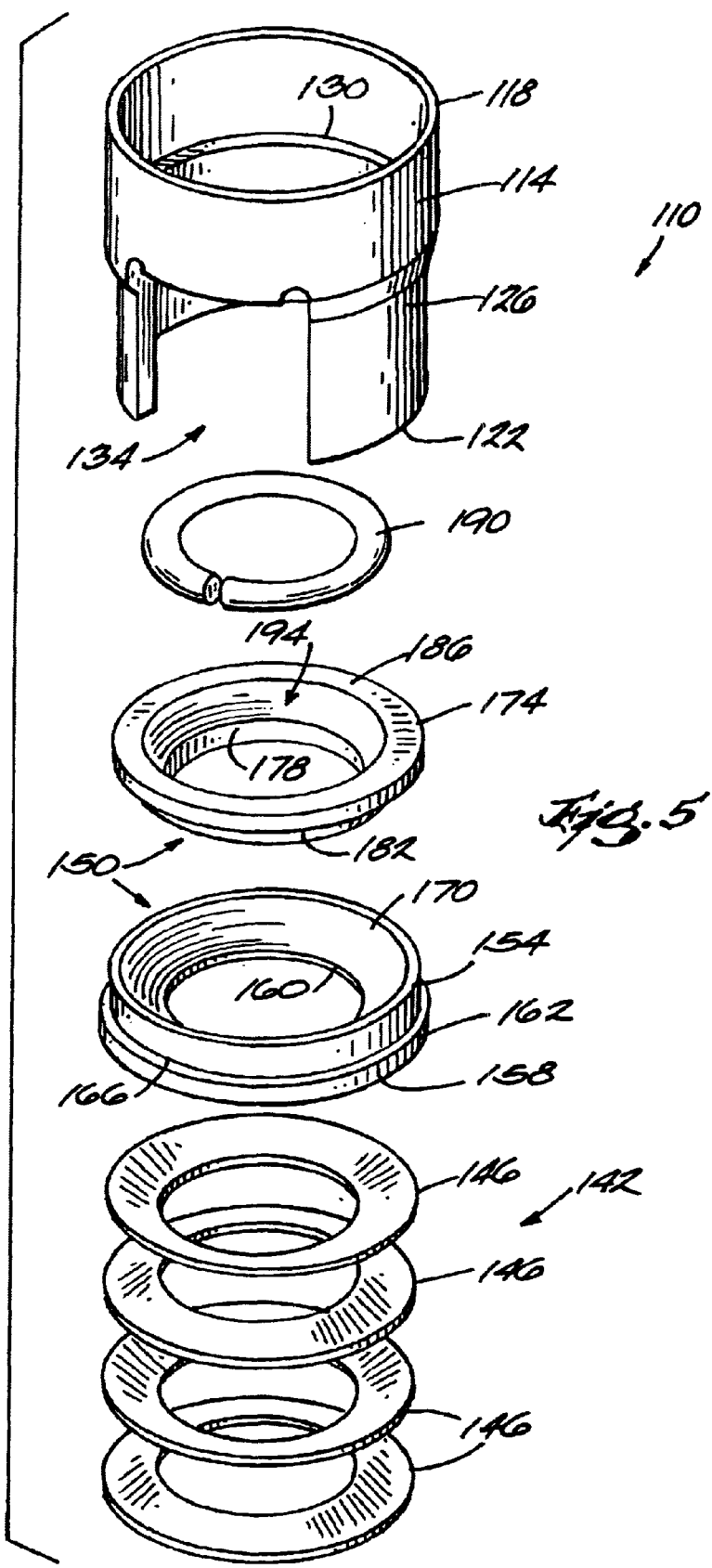

SPARK IGNITION DIRECT INJECTION SYSTEM

FIELD OF THE INVENTION

The invention relates to fuel injection systems, and more particularly to spark ignition direct injection systems.

BACKGROUND OF THE INVENTION

Spark ignition direct injection systems are known for directly injecting fuel into the combustion chamber of an internal combustion engine. Typically, the fuel injectors of prior art direct injection systems are installed into ports in the cylinder head and are then rigidly clamped to the cylinder head using various clamping devices. The fuel rail is then mounted on the injectors and secured to the engine.

Other prior art techniques dispose a compression spring or Belleville washers between the fuel rail and the injector and then secure the fuel rail to the engine so that the spring or washers bias the injector toward the cylinder head. Another prior art technique utilizes Belleville washers positioned between a threaded clamping nut and the injector. The clamping nut is screwed into the cylinder head and the Belleville washers urge the injector toward the combustion chamber and away from the clamping nut.

SUMMARY OF THE INVENTION

The present invention provides an improved spark ignition direct injection system that couples an improved spring assembly to a fuel injector. Unlike prior springs or washers used to bias injectors, the spring assembly of the invention utilizes the "squeeze film effect," a form of viscous damping, to facilitate installation of the injector into the cylinder head, to achieve the necessary seating force to maintain proper seating in the cylinder head, and to substantially prevent unseating of the injector during operation of the injection system. The squeeze film effect permits insertion of the injector at assembly using only a modest force input, and yet substantially prevents the injector from being unseated by the much larger forces applied to the injector during engine knocking/backfiring. The resistive spring force generated by the spring assembly varies inversely with the speed and duration at which an input force is applied to the injector. In other words, the relatively slow and steady application of force to seat the injector in the cylinder head results in a relatively low resistive spring force generated in the spring assembly, while a sudden, impact-type force on the injector caused by an engine backfire will generate a much higher resistive spring force or clamping force in the spring assembly.

The spring assembly includes a housing sized to fit directly on the outer surface of a fuel injector, thereby minimizing the added space requirements of the overall injection system. A spring, preferably in the form of a plurality of alternatingly-oriented disc springs, and a high viscosity material (e.g., grease) are positioned in the housing between the outer surface of the injector and the inner surface of the housing to achieve the desired squeeze film effect.

In one aspect of the invention, a retainer is coupled to the housing to close the open end of the housing. In addition to closing the open end of the housing, the retainer also provides a seating surface against which one end of the spring is seated. The retainer is at least partially received in the housing and is movable within the housing to accommodate retraction and expansion of the spring.

In another aspect of the invention, the retainer is comprised of first and second retainer members. One of the retainer members includes a concave surface and the other retainer member includes a convex surface movably engaged with the concave surface. When the injector is coupled to the fuel rail, the mating concave and convex surfaces permit the injector to pivot or tilt with respect to the fuel rail. This arrangement substantially eliminates bending moments on the injector that could otherwise be created by lateral misalignment between the fuel rail and the injector.

The invention also provides a method of seating and maintaining a fuel injector in an injector port of a cylinder head when the fuel injector is sandwiched between the fuel rail and the cylinder head. The method includes coupling the spring assembly to the fuel injector between the cylinder head and the fuel rail, and resisting the unseating of the injector from the injector port via the squeeze film effect created by the cooperation of the spring, the housing, and the viscous material of the spring assembly. A large resistive spring force or clamping force is generated in the spring assembly when a sudden force is applied to the injector in the direction of the fuel rail. The large clamping force operates to resist rapid movement of the injector toward the fuel rail.

Other features and advantages of the invention will become apparent to those skilled in the art upon review of the following detailed description, claims, and drawings.

BRIEF DESCRIPTION OF THE DRAWINGS

FIG. 3 is an enlarged, partial section view of a portion of the fuel rail assembly illustrating the spring assembly of the invention.

FIG. 4 is a view similar to FIG. 3 prior to inserting the injector into the fuel rail.

FIG. 5 is an exploded view of the spring assembly shown in FIGS. 3 and 4.

Figure 1:
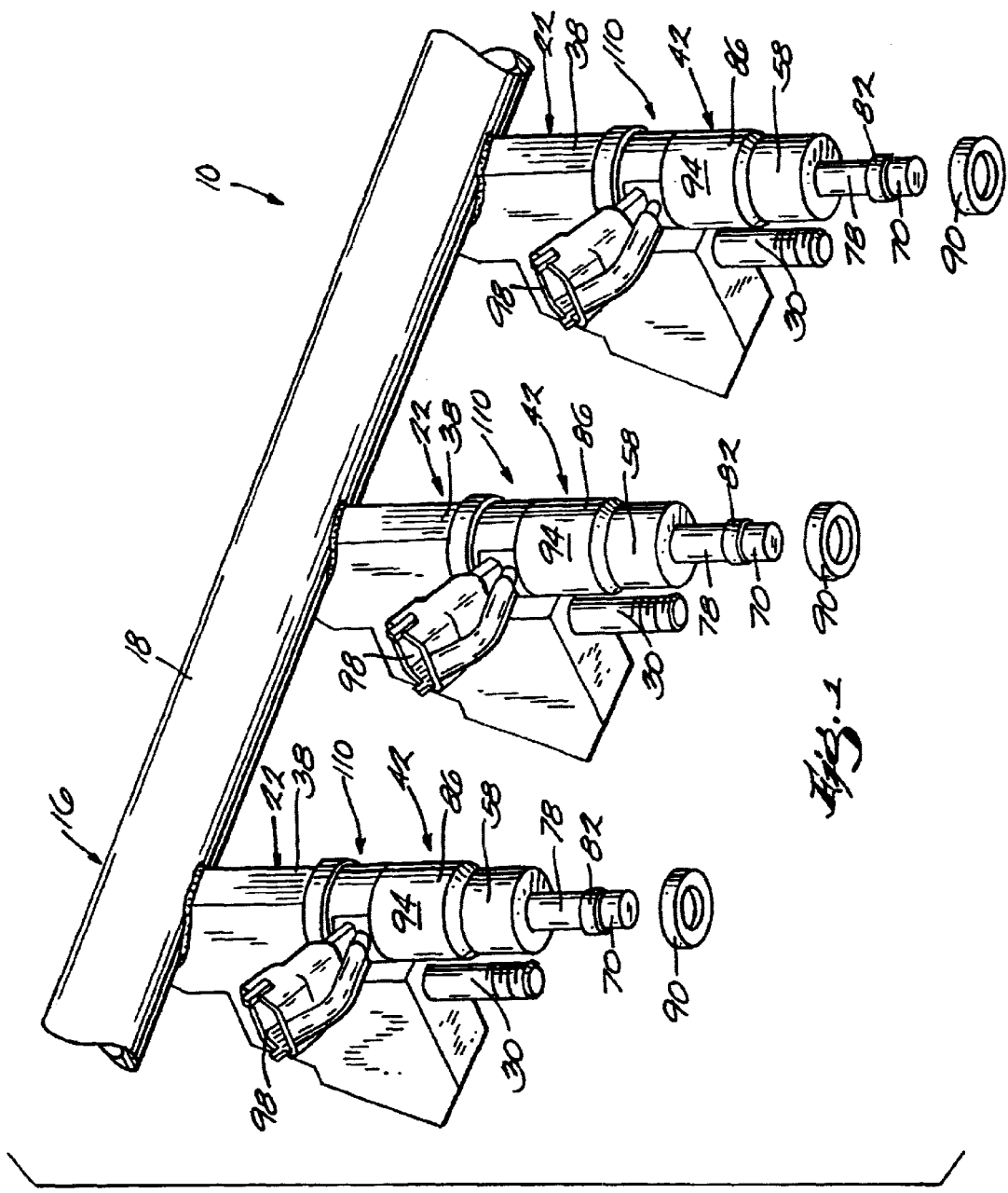
FIG. 1 is a perspective view of a portion of a fuel rail assembly embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 2:
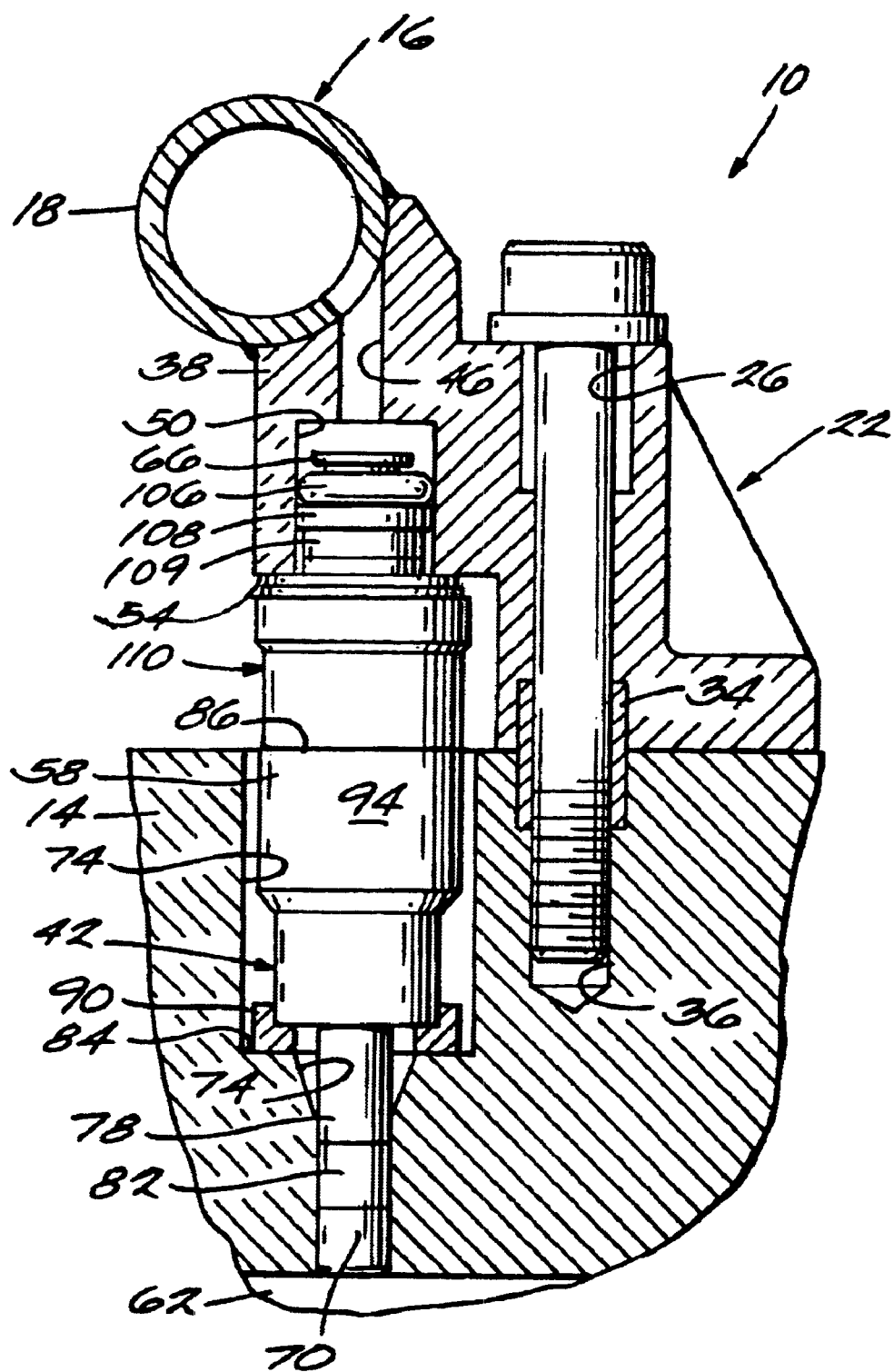
FIG. 2 is a section view showing the fuel rail assembly of FIG. 1 mounted on a cylinder head.

FIGS. 1 and 2 illustrate a portion of a fuel injection system 10 embodying the invention. The illustrated fuel injection system 10 is a spark ignition direct injection fuel system, wherein fuel is injected directly into the cylinder head 14 (see FIG. 2) of an internal combustion engine. The fuel injection system 10 includes a fuel rail 16 with a fuel conduit 18 having spaced mounting bosses 22 connected thereto. The mounting bosses 22 each include (see FIG. 2) a bore 26 for receiving a fastener 30 that secures the fuel rail 16 to the cylinder head 14. An alignment member 34 in the form of a sleeve can be used to facilitate aligning the bore 26 with the corresponding fastener receiving opening 36 in the cylinder head 14. Of course, the alignment member can be eliminated if desired.

Each mounting boss 22 further includes a portion 38 for receiving a respective fuel injector assembly 42. A fuel passageway 46 (see FIG. 2) in the injector assembly receiving portion 38 communicates with the conduit 18 so that fuel can flow from the conduit 18 to the injector assembly 42. An injector receiving socket 50 receives the inlet end of the respective injector assembly 42 and communicates with the fuel passageway 46 as seen in FIG. 2. The injector assembly receiving portion 38 defines a seating surface or shoulder 54 surrounding the socket 50 and against which the injector assembly 42 is seated, as will be described in further detail below.

In the illustrated embodiment, the conduit 18 and the mounting bosses 22 are separate metal parts, with at least the conduit 18 preferably made from steel to accommodate the significant pressure pulsations. The mounting bosses 22 are welded or brazed to the conduit 18 in the desired locations, depending on the engine configuration. Other fuel rail configurations, including, but not limited to, molded aluminum fuel rails, can also be used. While FIG. 1 illustrates a fuel rail 16 having three injector assemblies 42, it is to be understood that other fuel rail configurations, having different numbers of fuel injectors, are contemplated by the invention.

Each fuel injector assembly 42 includes an electromechanical fuel injector valve 58 operable in a known manner to selectively inject fuel into the combustion chamber 62 (see FIG. 2). The injector 58 includes a first or inlet end 66 configured to be received in the socket 50 of the fuel rail 16 and to communicate with the conduit 18 via the fuel passageway 46. The injector 58 further includes a second or outlet end 70 configured to be received in an injector port 74 formed in the cylinder head 14 and to communicate with the combustion chamber 62.

In the illustrated embodiment, the outlet end 70 of the injector 58 comprises an outlet tube 78 configured to be received in a small-diameter portion of the injector port 74. A teflon seal 82 provides a substantially fluid-tight seal between the outer surface of the outlet tube 78 and the inner surface of the injector port 74. The injector port 74 preferably tapers from the small-diameter portion to a seat 84 configured to support a body portion 86 of the injector 58. The taper adjacent the seat 84 facilitates installation of the outlet tube 78 into the injector port 74. A lead washer 90 or other similar device can be used to facilitate seating the body portion 86 of the injector 58 against the seat 84.

The body portion 86 is connected to the outlet tube 78 and defines an outer surface 94 of the injector 58. An electrical connector 98 extends from the body portion 86 away from the outer surface 94 for electrical connection to the engine control unit (not shown). As will be described below, the electrical connector 98, as well as portions of the injector 58 between the electrical connector 98 and the inlet end 66, can be plastic or can be overmolded with plastic to both protect the injector components and facilitate assembly. A fuel inlet tube 102 (see FIGS. 3 and 4) extends from the end of the body portion 86 at the inlet end 66 of the injector 58. An O-ring 106 is mounted on the inlet tube 102 to sealingly engage the inner wall of the socket 50 when the injector 58 is inserted into the fuel rail 16.

The O-ring 106 is partially supported on the injector 58 by a back-up ring 108 (see FIGS. 3 and 4) that is snapped onto the inlet tube 102. The back-up ring 108 is of a known split construction having an opening (shown in phantom in FIGS. 3 and 4) through which the inlet tube 102 can be inserted until the back-up ring 108 snaps into place. The split configuration accommodates tolerance variations inside socket 50, as is understood by those skilled in the art. In the illustrated embodiment, the back-up ring 108 sits atop a molded portion 109 surrounding part of the inlet tube 102.

Each injector assembly 42 further includes a spring assembly 110 mounted on the outer surface 94 of the body portion 86. When the injector 58 is coupled between the fuel rail 16 and the cylinder head 14, the spring assembly 110 operates to bias and maintain the injector 58 in position with respect to the injector port 74.

As best shown in FIGS. 3–5, the spring assembly 110 includes a generally cylindrical housing or cup 114 preferably made from deep-drawn sheet metal, such as steel, brass, bronze, or the like. The housing 114 includes an upper end 118, a lower end 122, and a stepped wall 126 extending between the upper and lower ends 118, 122. The terms "upper" and "lower" as used herein and in the appended claims are for the purposes of description only, and are not intended to imply any particular orientation. The inner surface of the stepped wall 126 defines an annular seating surface 130, the purpose of which will be described below.

As best seen in FIG. 5, the wall 126 also includes a notch 134 extending from the lower end 122. The notch 134 is sized to accommodate the electrical connector 98 extending from the outer surface 94 of the body portion 86. In the illustrated embodiment, the electrical connector 98 is integrally formed with a plastic piece 136 (see FIGS. 3 and 4) that defines a portion of the outer surface 94 adjacent the inner surface of the housing 114. A protrusion 137 extends from the plastic piece 136 and is received by the notch 134 to rotationally locate the housing 114. Other configurations for the electrical connector 98, that will vary the contour or material of the outer surface 94, can also be accommodated. For example, in some embodiments, the plastic piece 136 may be made from metal, or may be eliminated altogether.

The housing 114 is sized to fit over the inlet end 66 of the injector 58 (prior to installing the back-up ring 108 and the O-ring 106), and the diameter of the lower end 122 is such that the lower end 122 abuts and is seated on a seating surface 138 defined on the outer surface 94 of the body portion 86. In the illustrated embodiment, the seating surface 138 is a metallic portion of the body portion 86 to facilitate carrying the load of the spring assembly 110. The portion of the wall 126 between the upper end 118 and the annular seating surface 130 is sized to receive a spring 142. In the illustrated embodiment, the spring 142 comprises a plurality of alternatingly-oriented disc springs or washers 146, however other known spring devices (e.g., compression springs, leaf springs, rectangular-wire compression springs, wave springs, and the like) can also be used, provided they are capable of producing the squeeze film effect described in detail below.

In the illustrated embodiment, four disc springs 146 are shown, each having an outer diameter slightly smaller than the inner diameter of the adjacent part of the wall 126. Likewise, each disc spring 146 has an inner diameter that is slightly larger than the outer diameter of the adjacent outer surface 94 of the injector 58. The purpose of these diametrical relationships will be explained below. The illustrated disc springs 146 are preferably made from steel, steel alloys, beryllium nickel, or other suitable spring-grade materials known to those skilled in the art. The lower-most disc spring 146 is seated on the seating surface 130, as shown.

The spring assembly 110 further includes a retainer 150 that cooperates with the housing 114 to substantially close the housing 114 and retain the disc springs 146 therein. In the illustrated embodiment, the retainer 150 includes a first or lower annular retainer member 154 having an annular, planar seating surface 158 against which the upper-most disc spring 146 is seated. A radially inner wall 160 of the retainer member 154 is sized to slidingly fit over the upper end 66 of the injector 58 (again, prior to installing the back-up ring 108 and the O-ring 106). A cylindrical, radially outer wall 162 of the retainer member 154 is sized to slidingly fit at least partially within the upper end 118 of the housing 114, and includes a shoulder 166 over which the upper end 118 of the housing 114 is crimped or otherwise deformed (see FIG. 4) to retain the retainer member 154 and the disc springs 146 in the housing 114. The engagement between the shoulder 166 the crimped portion of the upper end 118 also limits movement of the retainer member 154 in a direction away from the outlet end 70 of the injector 58 so as to maintain the loading on the spring 142, as will be discussed in detail below. The retainer member 154 also includes an annular, concave surface 170 opposite the seating surface 158. The purpose of the concave surface 170 will be described below.

The illustrated retainer 150 also includes a second or upper annular retainer member 174 having a radially inner wall 178 sized to slidingly fit over the upper end 66 of the injector 58 (again, prior to installing the back-up ring 108 and the O-ring 106). The retainer member 174 further includes an annular, convex surface 182 configured to engage the concave surface 170 of the retainer member 154 in the manner shown in FIGS. 3 and 4. As will be described in more detail below, the engaging concave and convex surfaces 170, 182 permit the injector 58 to pivot or tilt with respect to the fuel rail 16 to facilitate alignment of the injector 58 with the corresponding injector port 74 and to substantially eliminate bending moments on the injector 58 that would otherwise be created by lateral misalignment between the fuel rail 16, the injector port 74, and the injector 58.

The retainer member 174 also includes a planar abutment surface 186 opposite the convex surface 182. The abutment surface 186 is configured to abut the shoulder 54 surrounding the socket 50 in the fuel rail 16. Therefore, when the injector 58 and fuel rail 16 are secured to the cylinder head 14, the spring assembly 110 is sandwiched between the seating surface 138 on the outer surface 94 of the body portion 86 and the shoulder 54 of the fuel rail 16. Because the spring assembly 110 is installed on the injector 58 prior to insertion of the injector 58 into the socket 50, an assembly aid in the form of a snap ring or split washer 190 can be used to retain the spring assembly 110 on the injector 58. The snap ring 190 is sized to fit in a recess 194 (see FIG. 5) formed in the abutment surface 186 of the retainer member 174.

It should be noted that the retainer 150 need not be the two-piece construction shown and described above, but rather could be a one-piece construction that would provide both a seat for the upper-most disc spring 146 and an abutment surface to abut the shoulder 54 of the fuel rail 16. Such a one-piece retainer would not include the illustrated convex/concave mating surfaces that operate to permit a degree of pivoting or tilting of the injector 58 relative to the fuel rail 16, unless such convex/concave mating surfaces were formed between the shoulder 54 and the corresponding abutment surface of the one-piece retainer. The retainer 150 can be made from suitable metals, such as steel, brass, bronze, or the like.

The spring assembly 110 also includes a viscous material 198 (represented generally by the stippling in FIGS. 3 and 4) in the housing 114 and at least partially surrounding the disc springs 146. In the illustrated embodiment, the viscous material 198 is a high viscosity grease, such as complex lithium or barium grease commonly available for lubricating wheel bearings and the like. The viscous material 198 is preferably a thixotropic or non-Newtonian material that resists the tendency to flow. Of course, those skilled in the art will recognize that other high viscosity materials, such as high viscosity oils, and Newtonian materials can be substituted where desired.

When high viscosity grease is used, the disc springs 146 can be generously coated with the grease prior to insertion into the housing 114. Alternatively, the grease can be added after the disc springs 146 are inserted into the housing 114. The particular viscosity value for the viscous material 198 is not critical, but rather can be varied to achieve the desired squeeze film effect. Those skilled in the art will recognize that within a suitable kinematic viscosity range (e.g., 700–2200 mm$^2$/sec), the higher the viscosity of the viscous material 198, the better the performance of the spring assembly 110. A viscosity of about 2000–2200 mm$^2$/sec is preferred, with the illustrated viscous material 198 having a viscosity of about 2000 mm$^2$/sec.

Referring to FIGS. 3 and 4, it is to be understood that the viscous material 198 need not, and likely will not, completely fill the portion of the housing containing the disc springs 146. Rather, the volume of the viscous material 198 should be such that the retainer 150 can move down within the housing 114 and the viscous material 198 can flow around the compressing disc springs 146 within the housing 114 to achieve the squeeze film effect. The clearance between the inner diameters of the disc springs 146 and the outer surface 94 of the injector 58, in addition to the clearance between the outer diameters of the disc springs 146 and the inner surface of the wall 126 allows the viscous material 198 to flow around the disc springs 146 within the housing 114 to achieve the desired squeeze film effect. The squeeze film effect will be described in greater detail below, in the discussion of the operation of the spring assembly 110.

The preferred pre-assembly method for the spring assembly 110 will now be described. First, the disc springs 146 are coated with the viscous material 198 and are then inserted into the housing 114 from the upper end 118 in the alternating orientation shown in FIGS. 3 and 4. Of course, fewer or more disc springs 146 could be used. Next, with the housing 114 being held in any suitable fixture, the retainer member 154 is inserted into the housing 114 and is pressed down to compress the disc springs 146 approximately forty percent of the available travel range between the free or uncompressed height of the disc springs 146 and the solid or fully compressed height of the disc springs 146. With the disc springs 146 compressed in this manner, the upper end 118 of the housing is crimped over the shoulder 166, thereby pre-loading the disc springs 146 inside the housing 114.

The package comprising the housing 114, the pre-loaded disc springs 146, the viscous material 198, and the retainer member 154 is then placed on the injector 58 over the inlet end 66 until the lower end 122 of the housing 114 abuts the seating surface 138. Next, the retainer member 174 is passed over the inlet end 66 until the convex surface 182 engages the concave surface 170 of the retainer member 154. The snap ring 190 is then placed in the recess 194 to hold the retainer member 174 in place. Finally, the back-up ring 108 and the O-ring 106 are installed on the inlet tube 102. FIG. 4 illustrates the pre-assembled state of the injector assembly 42 with the spring assembly 110 in place on the outer surface 94 of the injector 58.

With the injector assembly 42 assembled, the inlet end 66 of the injector 58 can be pressed into the socket 50 of the fuel rail 16 until the abutment surface 186 abuts the shoulder 54 adjacent the socket 50. At this point, the shoulder 54 operates to hold the retainer member 174 in engagement with the retainer member 154, and the snap ring 190 is merely redundant until such time as the injector assembly 42 is removed from the socket 50 for maintenance or replacement. The O-ring 106 and back-up ring 108 retain the injector assembly 42 in the socket 50 so that the fuel rail 16 and the installed injector assemblies 42 can be installed on the cylinder head 14 as a single unit.

Installation of the fuel rail assembly (comprising the fuel rail 16 and the injector assemblies 42) will now be described. The installer aligns the outlet ends 70 of the injectors 58 with the injector ports 74 in the cylinder head 14. Once aligned, the fuel rail assembly is moved toward the cylinder head 14 so the outlet ends 70 pass through the respective lead washers 90 and enter the respective small-diameter portions of the injector ports. The tapered portions help guide entry of the outlet ends 70 into the small-diameter portions until each body portion 86 is seated with the respective lead washer 90 on the seat 84. Of course, the lead washers 90 can be installed in the injector ports 74 prior to insertion of the fuel rail assembly, or alternatively, can be placed on the outlet tubes 178 of the injectors 58 for insertion with the injectors 58.

The retainer 150 facilitates insertion of the injectors 58 into the respective injector ports 74 by accommodating lateral misalignment that may be due to tolerance stack-ups or other variances. As best shown in FIG. 3, the concave and convex surfaces 172, 180 are radiused about a point P that is substantially co-axial with the O-ring 106 on the centerline CL of the injector 58. This permits the injector 58 to pivot or tilt about the O-ring 106 with respect to the fuel rail 16 (as represented by the tilted centerline CL'), thereby facilitating alignment of the injector 58 with the corresponding injector port 74 and substantially eliminating bending moments on the injector 58 that would otherwise be created by lateral misalignment between the fuel rail 16, the injector port 74, and the injector 58. Instead, these bending forces will be absorbed by the O-ring 106 as it is pivoted/moved within the socket 50. Because the back-up ring 108 is split, it can also accommodate any pivoting or tilting of the injector 58 in the socket 50.

Once the mounting bosses 22 of the fuel rail 16 near engagement with the cylinder head 14, the fasteners 30 are inserted and tightened to secure the fuel rail assembly on the cylinder head 14. The tightening of the fasteners 30 seat the injectors 58 in the injector ports 74. In the illustrated embodiment, a seating force of about 200 N is required to properly seat and maintain each injector 58 in the injector ports 74. As the fasteners 30 are tightened, the shoulder 54 presses the retainer members 174 and 154, thereby further compressing the disc springs 146 inside the housing 114 as the retainer member 154 slides inside the housing 114 toward the lower end 122 (see FIG. 3). Preferably, the disc springs 146 will be compressed approximately thirty percent of the remaining available travel range (to a total of about seventy percent of the available travel range) when the fasteners 30 are fully tightened, leaving approximately thirty percent of available travel range to accommodate engine knocking/backfiring conditions. The loaded disc springs 146 bias the injector 58 toward the seated position in the cylinder head 14 (i.e., in a direction toward the outlet end 70 of the injector 58).

The squeeze film effect utilized by the spring assembly 110 will now be described. The squeeze film force or resistive spring force W generated by the illustrated spring assembly 110 can be represented generally by the following equation:

$$W = \frac{(OD + ID)}{(OD - ID)} * \frac{(3 * \pi * \mu * (OD - ID)^4)}{2 * \left(\frac{H \max}{2}\right)^3} \frac{dH}{dt}$$

where: $\mu$=absolute viscosity of the viscous material 198
Hmax =maximum distance between adjacent surfaces of the disc springs 146 in the assembled condition
OD =outside diameter of disc springs 146
ID =inside diameter of disc springs 146

As used herein and in the appended claims, the term "spring force" includes both the force generated by the compression of the disc springs 146 alone and the additional force (if any) generated due to the presence of the viscous material 198 around the disc springs 146 as the disc springs 146 are being compressed. As will be evident from the discussion below, in some situations, the spring force W will be low and will be comprised mainly of the force generated by the disc springs 146 alone. In other situations, the spring force W will be high to provide a high clamping force comprised of both the force generated by the disc springs 146 alone, as well as the added force generated due to the presence of the viscous material 198 around the disc springs 146 during compression, or the attempted compression of the disc springs 146.

Because the spring force W is a function of the change in distance between adjacent spring surfaces over time, the resistive spring force W generated by the spring assembly 110 is dependent on the type of input force applied to the spring assembly 110. For example, a sudden impact force applied to the spring assembly 110 in a direction toward the fuel rail 16, such as the force created by engine knocking/backfiring (which can be as high as about 4 bar at engine start-up conditions) will cause the spring assembly 110 to generate a high resistive spring force $W_{high}$ in the opposite direction to counteract the backfiring force and maintain the proper seating of the injector 58 in the injector port 74. The resistive spring force $W_{high}$ is high in this situation because of the viscous material's inability to flow out from between the disc springs 146 rapidly enough, in response to the very sudden backfire input force, to allow the disc springs 146 to rapidly compress.

On the other hand, the input force applied to the spring assembly 110 in the direction toward the cylinder head 14 during the tightening of the fasteners 30 will generate a much lower resistive spring force $W_{low}$ in the opposite direction because the input force applied to the spring assembly 110 by the tightening of the fasteners 30 is much slower and more consistently applied (non-sudden) than the backfiring forces. The viscous material 198 has more time to flow out from between the disc springs 146, thereby allowing the disc springs 146 to compress much more easily. Therefore, the lower resistive spring force $W_{low}$ will not make mounting the fuel rail assembly to the cylinder head 14 a difficult task.

It can therefore be seen that the spring assembly 110 utilizing the squeeze film effect provides the flexibility of a spring to accommodate longitudinal tolerance stack-up problems without sacrificing the proper seating and operational quality of the injectors 58 and without making installation of the fuel rail assembly unduly burdensome. In addition the retainer 150 of the spring assembly 110 accommodates lateral misalignment, as described above. Furthermore, the illustrated spring assembly 110 does not substantially add to the overall size of the injection system's envelope, does not interfere with the injector's electrical connector 98, and does not interfere with the space needed for the fluid channels in the cylinder head 14.

Various features of the invention are set forth in the following claims.

What is claimed is:

1. A fuel injector assembly comprising:
   a fuel injector having a first end configured to communicate with a fuel source, a second end configured to communicate with a combustion chamber, and an outer surface extending between the first and second ends; and
   a spring assembly coupled to the outer surface between the first and second ends to bias the injector in the direction of the second end and resist movement of the injector in the direction of the first end when the injector is coupled between the fuel source and the combustion chamber, the spring assembly including
   a housing;
   a spring in the housing; and
   a viscous material at least partially surrounding the spring in the housing.

2. The injector assembly of claim 1, wherein the injector includes an electrical connector extending from the outer surface and wherein the housing includes an opening for receiving the electrical connector.

3. The injector assembly of claim 1, wherein the viscous material has a viscosity of about 2000–2200 mm$^2$/sec.

4. The injector assembly of claim 1, wherein the viscous material is a grease.

5. The injector assembly of claim 1, wherein the housing includes a seating surface against which one end of the spring is seated.

6. The injector assembly of claim 1, wherein the spring assembly further includes a retainer partially within the housing for closing an end of the housing, the retainer including a seating surface against which one end of the spring is seated.

7. The injector assembly of claim 1, wherein the spring assembly further includes a retainer for closing an end of the housing, the retainer including a first member having a concave surface and a second member having a convex surface movably engaging the concave surface of the first member, thereby permitting the injector to pivot with respect to a fuel rail in which the injector is mounted.

8. The injector assembly of claim 1, wherein the spring assembly further includes a retainer partially within the housing for closing an end of the housing, the retainer being movable within the housing to accommodate retraction and expansion of the spring.

9. The injector assembly of claim 1, wherein the spring is a plurality of alternatingly-oriented disc springs.

10. A fuel injection system comprising:
    a cylinder head having an injector port;
    a fuel injector having a first end and a second end, the second end being received in the injector port;
    a fuel rail having a socket, the first end of the fuel injector being received in the socket; and
    a spring assembly coupled between the fuel rail and the injector to bias the injector toward the cylinder head, the spring assembly including a housing, a spring in the housing, and a viscous material at least partially surrounding the spring in the housing, the spring assembly utilizing a squeeze film effect to resist movement of the injector in a direction toward the fuel rail.

11. The fuel injection system of claim 10, wherein the spring is a plurality of alternatingly-oriented disc springs.

12. The fuel injection system of claim 10, wherein the injector includes an electrical connector and wherein the housing includes an opening for receiving the electrical connector.

13. The fuel injection system of claim 10, wherein the viscous material has a viscosity of about 2000–2200 mm$^2$/sec.

14. The fuel injection system of claim 10, wherein the viscous material is a grease.

15. The fuel injection system of claim 10, wherein the housing includes a seating surface against which one end of the spring is seated.

16. The fuel injection system of claim 10, wherein the spring assembly further includes a retainer partially within the housing for closing an end of the housing, the retainer including a seating surface against which one end of the spring is seated.

17. The fuel injection system of claim 10, wherein the spring assembly further includes a retainer for closing an end of the housing, the retainer includes a first member having a concave surface and a second member having a convex surface movably engaging the concave surface of the first member, thereby permitting the injector to pivot with respect to the fuel rail.

18. The fuel injection system of claim 17, wherein the injector further includes a seal ring on the first end of the injector and received in the socket for substantially preventing leakage of fuel between the fuel rail and the injector, and wherein the concave and convex surfaces of the retainer are configured to permit the injector to pivot about the seal ring with respect to the socket.

19. The fuel injection system of claim 10, wherein the spring assembly further includes a retainer partially within the housing for closing an end of the housing, the retainer being movable within the housing to accommodate retraction and expansion of the spring.

20. A method of seating and maintaining a fuel injector in an injector port of a cylinder head, the fuel injector being sandwiched between a fuel rail and the cylinder head, the method comprising:
    coupling a spring assembly to the fuel injector between the cylinder head and the fuel rail, the spring assembly including a housing, a spring, and a viscous material contained in the housing; and
    substantially resisting the unseating of the injector from the injector port via a squeeze film effect created by the cooperation of the spring, the housing, and the viscous material.

21. The method of claim 20, wherein substantially resisting the unseating of the injector includes generating a large spring force in the spring assembly when a sudden force is applied to the injector in the direction of the fuel rail, the large spring force operating to resist movement of the injector toward the fuel rail.

22. The method of claim 21, wherein the large spring force is generated by the inability of the viscous material to flow inside the housing and around the spring during the application of the sudden force.

23. The method of claim 21, wherein the sudden force applied to the injector is caused by a backfire in the combustion chamber of an internal combustion engine.

24. The method of claim 21, further comprising:
    compressing the spring using a non-sudden force when the injector is being sandwiched between the fuel rail and the cylinder head, the compression generating a spring force in the spring assembly that is smaller than the large spring force to facilitate seating the injector in the injector port.

25. The method of claim 20, wherein the spring assembly is coupled between the fuel rail and the injector.

* * * * *